(12) United States Patent
Otaki et al.

(10) Patent No.: US 11,945,471 B2
(45) Date of Patent: Apr. 2, 2024

(54) AUTONOMOUS DRIVING DELIVERY SYSTEM

(71) Applicant: Toyota Jidosha Kabushiki Kaisha, Toyota (JP)

(72) Inventors: Sho Otaki, Yokohama (JP); Takayuki Iwamoto, Shizuoka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 292 days.

(21) Appl. No.: 16/804,834

(22) Filed: Feb. 28, 2020

(65) Prior Publication Data
US 2020/0324793 A1   Oct. 15, 2020

(30) Foreign Application Priority Data

Apr. 9, 2019 (JP) .................................. 2019-074374

(51) Int. Cl.
*B60W 60/00* (2020.01)
*G06Q 10/083* (2023.01)
(Continued)

(52) U.S. Cl.
CPC ..... *B60W 60/00256* (2020.02); *G06Q 10/083* (2013.01); *G08G 1/096725* (2013.01);
(Continued)

(58) Field of Classification Search
CPC ........ B60W 60/00256; B60W 2554/40; G06Q 10/083; G08G 1/096725; H04W 4/029; G05D 1/0088
See application file for complete search history.

(56) References Cited

U.S. PATENT DOCUMENTS

| 10,726,379 B1* | 7/2020 | Donnelly ............... G05D 1/104 |
| 2006/0145837 A1 | 7/2006 | Horton et al. |

(Continued)

FOREIGN PATENT DOCUMENTS

| JP | 2008-524699 A | 7/2008 |
| JP | 2010-235269 A | 10/2010 |

(Continued)

OTHER PUBLICATIONS

Investigating Public Opinions towards Emerging Transportation Technologies and Service Forms Wang, X; Schmid, J; Gonzalez, C R; Rios, D R; Miller, M; et al. National Technical Information Service. (Aug. 2018). (Year: 2018).*

*Primary Examiner* — Elaine Gort
*Assistant Examiner* — Chanmin Park
(74) *Attorney, Agent, or Firm* — Dinsmore & Shohl LLP (57) ABSTRACT

An autonomous driving delivery system that delivers luggage to a user by an autonomous driving vehicle includes: an early delivery request reception unit configured to receive a request for early delivery of the luggage from a user's mobile terminal; a position information acquisition unit configured to acquire position information of the user's mobile terminal when the early delivery request reception unit receives the request for early delivery; a candidate delivery location proposal unit configured to propose at least one candidate delivery location from a plurality of predetermined stop locations to the user's mobile terminal based on the position information when the position information is acquired by the position information acquisition unit; and a delivery location determination unit configured to designate the candidate delivery location selected by the user as a delivery location of the luggage.

3 Claims, 9 Drawing Sheets

(51) Int. Cl.
    *G08G 1/0967*     (2006.01)
    *H04W 4/029*      (2018.01)
    *G05D 1/00*       (2006.01)

(52) U.S. Cl.
    CPC ........ *H04W 4/029* (2018.02); *B60W 2554/40* (2020.02); *G05D 1/0088* (2013.01)

(56) References Cited

U.S. PATENT DOCUMENTS

| | | | |
|---|---|---|---|
| 2020/0074396 A1* | 3/2020 | Boccuccia | G06Q 10/083 |
| 2020/0097890 A1* | 3/2020 | Migita | G06Q 10/047 |
| 2020/0193362 A1* | 6/2020 | Nishikawa | G06Q 10/08 |
| 2020/0285240 A1* | 9/2020 | Diehl | G05D 1/0088 |

FOREIGN PATENT DOCUMENTS

| | | | | |
|---|---|---|---|---|
| JP | 2013-170050 A | | 9/2013 | |
| JP | 2018-206155 A | | 12/2018 | |
| JP | 2019040587 A | * | 3/2019 | ............ B60W 40/08 |

* cited by examiner

AUTONOMOUS DRIVING DELIVERY SYSTEM

CROSS-REFERENCE TO RELATED APPLICATION

This application claims the benefit of priority from Japanese Patent Application No. 2019-74374, filed Apr. 9, 2019, the entire contents of which are incorporated herein by reference.

TECHNICAL FIELD

The present disclosure relates to an autonomous driving delivery system.

BACKGROUND

In the related art, Japanese Unexamined Patent Publication No. 2008-524699 is known as a literature relating to a delivery of pieces of luggage. This publication discloses a monitoring system for monitoring whether or not the luggage has been delivered to a delivery location using a global positioning system (GPS).

SUMMARY

Incidentally, in the luggage delivery, it is necessary to consider both a user convenience and the delivery efficiency. In this regard, in a delivery of pieces of luggage by an autonomous driving vehicle, there is a demand for improvement in the user convenience and improvement in the delivery efficiency by information utilization.

An autonomous driving delivery system according to an aspect of the present disclosure is a system that delivers luggage to a user by an autonomous driving vehicle. The system includes: an early delivery request reception unit configured to receive a request for early delivery of the luggage from a user's mobile terminal; a position information acquisition unit configured to acquire position information of the user's mobile terminal when the early delivery request reception unit receives the request for early delivery; a candidate delivery location proposal unit configured to propose at least one candidate delivery location from a plurality of predetermined stop locations to the user's mobile terminal based on the position information when the position information is acquired by the position information acquisition unit; and a delivery location determination unit configured to determinate the candidate delivery location selected by the user as a delivery location of the luggage.

According to the autonomous driving delivery system in an aspect of the present disclosure, the candidate delivery location can be proposed to the user using the position information on the user's mobile terminal, and the delivery location can be determined (designated) by the selection of the user from the candidate delivery locations. This is possible to improve the user convenience by setting the delivery location corresponding to the user's position information. Furthermore, according to the autonomous driving delivery system, by setting the delivery location taking the user's position information into consideration, it is possible to suppress a situation in which an autonomous driving vehicle or the like waits for a long time until the user arrives. This is possible to improve the delivery efficiency.

In the autonomous driving delivery system according to the aspect of the present disclosure, the candidate delivery location proposal unit may be configured to acquire road traffic information relating to the plurality of stop locations, and propose the candidate delivery location to the user based on the road traffic information and the position information.

In the autonomous driving delivery system according to the aspect of the present disclosure, the early delivery request reception unit may be configured to be able to receive the request for early delivery of the luggage when the delivery of the luggage is a redelivery.

In the autonomous driving delivery system according to the aspect of the present disclosure, the candidate delivery location proposal unit may be configured to propose only the stop locations close to the position of the user's mobile terminal as the candidate delivery locations when the number of redeliveries of the luggage is equal to or greater than a determination threshold value compared to a case that the number of redeliveries of the luggage is less than the determination threshold value.

According to an aspect of present disclosure, it is possible to improve the user convenience and the delivery efficiency in the delivery of pieces of luggage by the autonomous driving vehicle.

DETAILED DESCRIPTION

An embodiment of the present disclosure will be described with reference to the drawings.

Figure 1:
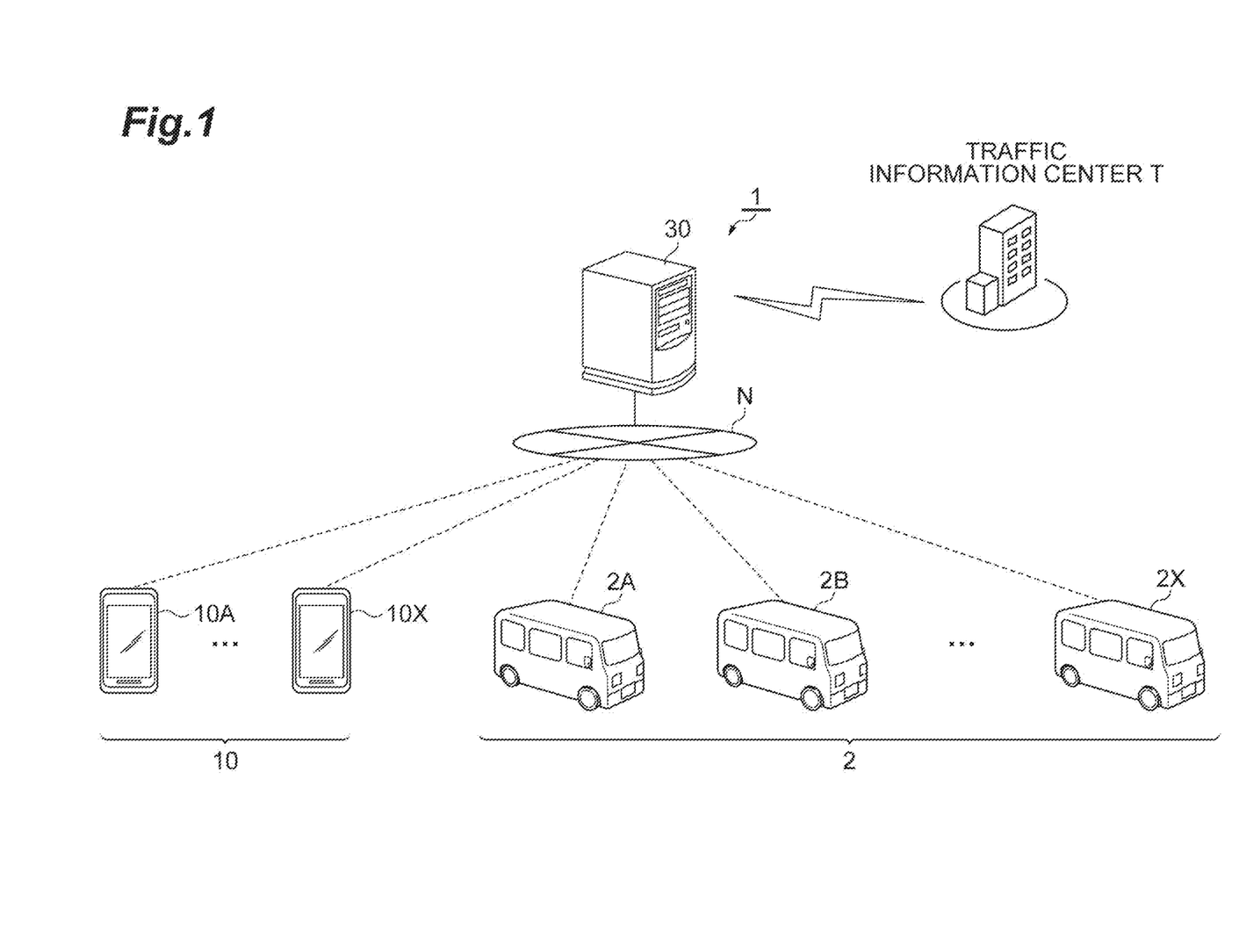
FIG. 1 is a diagram illustrating an example of a configuration of an autonomous driving delivery system in an embodiment.

An autonomous driving delivery system 1 illustrated in FIG. 1 is a system for performing delivery of pieces of luggage by an autonomous driving vehicle. The autonomous driving delivery system 1 can perform the delivery of the luggage by an autonomous driving vehicle in response to a delivery request and a request for early delivery from a user's mobile terminal. Details of the delivery request and the request for early delivery will be described later.

The mobile terminal is an information terminal carried by each user. The user is a user of the autonomous driving delivery system 1. In the present embodiment, the user means a recipient of the luggage. Examples of the mobile terminal include a smartphone, a tablet type personal computer, a laptop computer, and a wearable computer. The mobile terminal in the present embodiment has a position measurement function for measuring a position of the mobile terminal by GPS or the like and a communication function for making a luggage delivery request to the autonomous driving delivery system 1.

The autonomous driving vehicle is a vehicle having an autonomous driving function for autonomously driving the vehicle toward a location set in advance. In the autonomous driving vehicle, the driver does not need to perform driving operation and travels autonomously. The autonomous driving vehicle includes various sensors, cameras, actuators, and the like for realizing the autonomous driving function. A person may or may not be in the autonomous driving vehicle. The autonomous driving vehicle performs the autonomous driving that travels toward the delivery location set by the autonomous driving delivery system 1 as a destination.

The autonomous driving vehicle has delivery boxes for loading the pieces of luggage, for example. For example, a plurality of delivery boxes is provided adjacent to each other vertically and horizontally. Each delivery box has an opening and closing door at the same direction. The delivery box is provided with a common input terminal in the same direction as the opening and closing door of each delivery box, the locked delivery box can be unlocked by inputting a passcode sent to the user's mobile terminal into the input terminal. A shape and a method of unlocking the delivery box are not particularly limited, and various modes can be adopted.

Configuration of Autonomous Driving Delivery System

As illustrated in FIG. 1, the autonomous driving delivery system 1 includes a server 30. The server 30 is installed in a facility, for example. The server 30 may be configured with the servers or computers provided at a plurality of locations. The server 30 is configured to be able to communicate with the autonomous driving vehicles 2A, 2B, ..., 2X and the user's mobile terminals 10A, 10B, ..., 10X. The network N is a wireless communication network.

The numbers of autonomous driving vehicles 2A, ..., 2X and the mobile terminals 10A, ..., lox are not particularly limited. Hereinafter, the description will be made using the autonomous driving vehicle 2 as a representative of the autonomous driving vehicles 2A, ..., 2X, and the mobile terminal 10 as a representative of the mobile terminals 10A, ..., 10X.

When receiving luggage delivery request from the mobile terminal 10, the server 30 instructs the autonomous driving vehicle 2 on which the corresponding luggage of the user is loaded among the autonomous driving vehicles 2 to deliver the luggage by the autonomous driving. In addition, the server 30 is configured to be able to communicate with a traffic information center T. The server 30 acquires road traffic information from the traffic information center T. The road traffic information includes various information relating to traffic conditions on the road. The server 30 may be connected to the traffic information center T via the network N.

Figure 2:
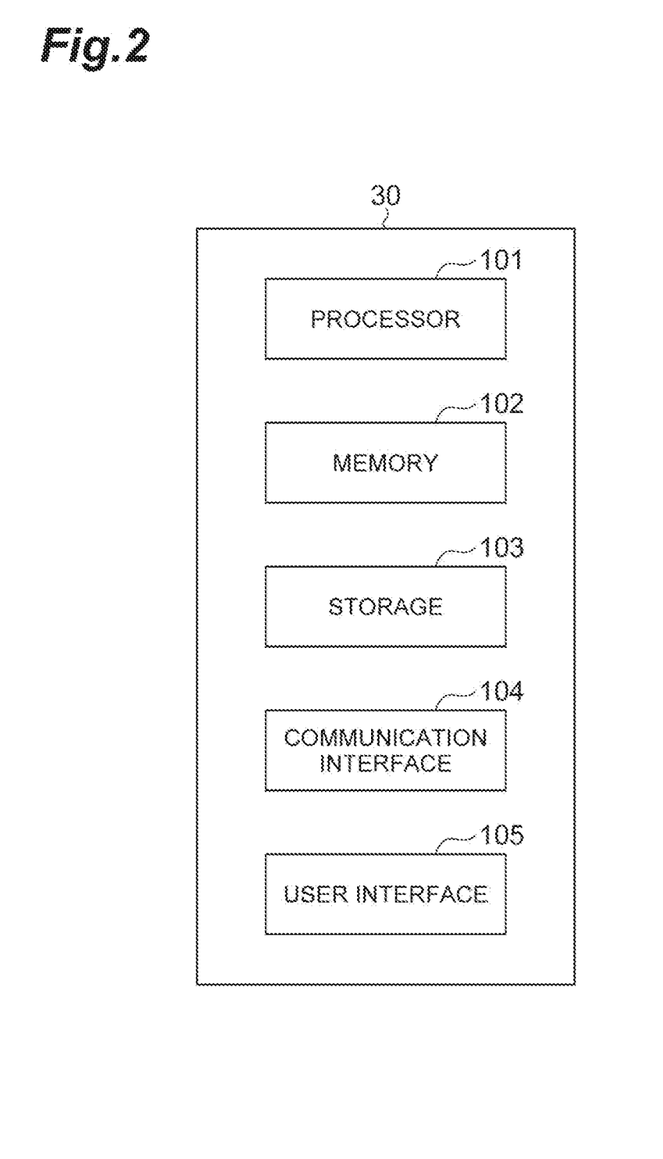
FIG. 2 is a diagram illustrating an example of a hardware configuration of a server.

FIG. 2 is a diagram illustrating an example of a hardware configuration of the server 30. As illustrated in FIG. 2, the server 30 can be configured as a general computer including a processor 101, a memory 102, a storage 103, a communication interface 104, and a user interface 105.

The processor 101 is an arithmetic operation unit such as a central processing unit (CPU). The memory 102 is a storage medium such as a read only memory (ROM) or a random access memory (RAM). The storage 103 is a storage medium such as a hard disk drive (HDD). The communication interface 104 is a communication device that realizes data communication. The user interface 105 is an output device such as a liquid crystal or a speaker, and an input device such as a touch panel or a microphone. The processor 101 realizes various functions of the server 30 by performing overall management of the memory 102, the storage 103, the communication interface 104, and the user interface 105. The mobile terminal 10 can adopt the same configuration as the hardware configuration. In the case of the mobile terminal 10, a flash memory may be used as the storage 103, or an online storage may be used.

Figure 3:
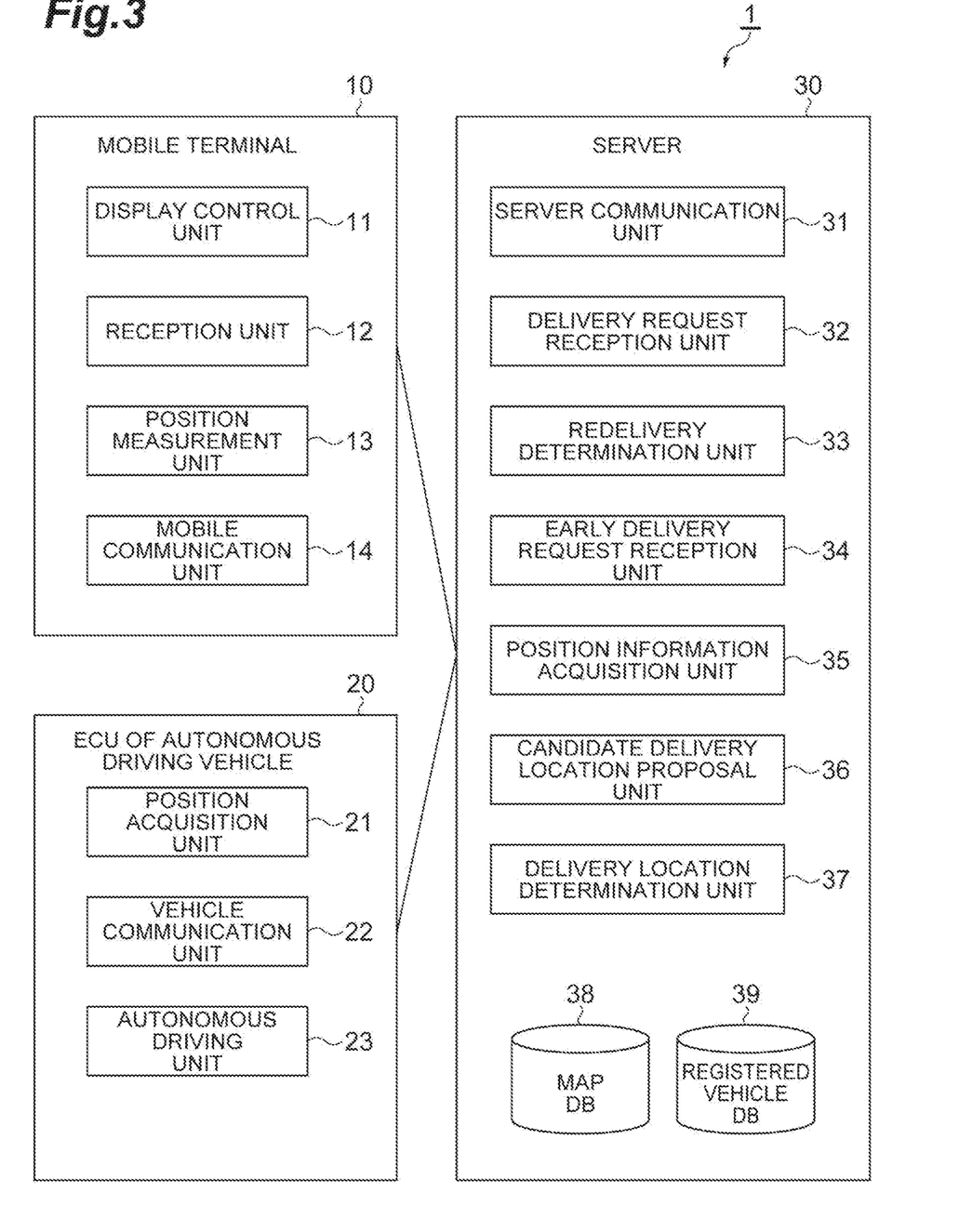
FIG. 3 is a diagram illustrating an example of a functional configuration of a user's mobile terminal, an autonomous driving vehicle, and the server.

FIG. 3 is a diagram illustrating an example of functional configurations of the user's mobile terminal 10, the autonomous driving vehicle 2, and the server 30. As illustrated in FIG. 3, the user's mobile terminal 10 includes a display control unit 11, a reception unit 12, a position measurement unit 13, and a mobile communication unit 14.

The display control unit 11 displays various displays on the screen of the mobile terminal 10. The display control unit 11 may display the content of the luggage or the delivery status of the luggage on the screen by the user's operation. The display control unit 11 performs display for the user to make luggage delivery request or the request for early delivery.

The reception unit 12 receives the user's operation. The reception unit 12 recognizes the user's operation by receiving an operation of a button of the mobile terminal 10 performed by the user, and/or an input to the touch panel.

The position measurement unit 13 measures a position of the mobile terminal 10 using a GPS receiver or the like incorporated in the mobile terminal 10. The position measurement unit 13 may be capable of performing the position measurement using base station information of the communication. The method of measuring the position of the mobile terminal 10 is not particularly limited. The mobile communication unit 14 manages the communication of the mobile terminal 10. The mobile communication unit 14 communicates with the server 30 and the mobile terminal 10 by being connected to the network N.

For example, if a user performs an operation to transmit the luggage delivery request or the request for early delivery, the mobile terminal 10 transmits the delivery request or the request for early delivery to the server 30 through the mobile communication unit 14. At this time, the mobile terminal 10 may transmit position information relating to the position of the mobile terminal 10 to the server 30 together with the delivery request or the request for early delivery. The mobile terminal 10 may be configured to transmit the position information on the mobile terminal 10 to the server 30 after receiving the position information transmission request from the server 30.

The autonomous driving vehicle 2 includes an electronic control unit (ECU) 20. The ECU 20 is an electronic control unit including a CPU, a ROM, a RAM, and the like. As illustrated in FIG. 3, the ECU 20 includes a position acquisition unit 21, a vehicle communication unit 22, and an autonomous driving unit 23.

The position acquisition unit 21 acquires a position of the autonomous driving vehicle 2 on the map based on position information and map information from the vehicle-mounted GPS receiver. The vehicle communication unit 22 manages the communication of the autonomous driving vehicle 2. The vehicle communication unit 22 communicates with the server 30 and the autonomous driving vehicle 2 by being connected to the network N. The vehicle communication unit 22 transmits the position information of the autonomous driving vehicle 2 to the server 30 via the network N. The vehicle communication unit 22 may directly communicate with the user's mobile terminal 10.

The autonomous driving unit 23 performs the autonomous driving of the autonomous driving vehicle 2. The autonomous driving unit 23 performs the autonomous driving by controlling various actuators (for example, an engine actuator, a brake actuator, and a steering actuator) of the autonomous driving vehicle 2.

The autonomous driving unit 23 performs the autonomous driving such that the autonomous driving vehicle 2 arrives at a plurality of predetermined stop locations. The stop location is a location at which the autonomous driving vehicle 2 can stop for delivering the luggage. The location may include only one parking or stopping space or a plurality of parking or stopping spaces. The stop location is a location at which parking or stopping of the autonomous driving vehicle 2 is not legally prohibited. The stop location is, for example, a parking lot. The stop location may be a parking section for parking or stopping the autonomous driving vehicle 2 provided in the parking lot. The stop location may be a parking lot of a store such as a convenience store.

The stop location may be a location on the road. The stop location can be a location on the road of which a road width is equal to or wider than a road width threshold value. The stop location may be a location on the road where the ratio of the vehicle width of the autonomous driving vehicle 2 to the road width is equal to or greater than a width ratio threshold value. The stop location may be a location on the road with a roadside zone. Each of the above threshold values is a predetermined set value. Note that various threshold values described below are also predetermined set values.

The stop location may be a location on the road having a sidewalk, and may be a location on the road where a vehicle lane and a sidewalk are not separated by a structure such as a guardrail. The stop location may be a road whose curvature is limited to be equal to or greater than a curvature threshold value. The stop location may be a road where the slope is limited to be less than a slope threshold value. The stop location may be an area extending along the road.

The autonomous driving unit 23 performs the autonomous driving of the autonomous driving vehicle 2 so as to reach the delivery location designated from the stop locations. The designation of the delivery location will be described later.

As illustrated in FIG. 3, the server 30 includes a server communication unit 31, a delivery request reception unit 32, a redelivery determination unit 33, an early delivery request reception unit 34, a position information acquisition unit 35, a candidate delivery location proposal unit 36, a delivery location determination unit 37, a map DB 38, and a registered vehicle DB 39. In addition, the server 30 has information relating to the delivery of the luggage.

The server communication unit 31 manages the communication between the server 30, the mobile terminal 10, and the autonomous driving vehicle 2. The server communication unit 31 may transmit the information relating to the delivery of the luggage to the autonomous driving vehicle 2 in response to the request from the user's mobile terminal 10.

The delivery request reception unit 32 receives a delivery request transmitted from the user's mobile terminal 10. The delivery request is a request to deliver the luggage to the user. The luggage means the luggage to be delivered by the autonomous driving vehicle 2. For example, the user operates the mobile terminal 10 and transmits the delivery request including information on the delivery location and a desired delivery time to the server 30. In a case of redelivery to the same delivery location, the user does not necessarily need to transmit the information on the delivery location.

When a luggage delivery request or a request for early delivery is transmitted from the user's mobile terminal 10, the redelivery determination unit 33 determines whether the luggage is the redelivery luggage or not. The redelivery determination unit 33 determines whether or not the luggage is a redelivery luggage based on the delivery history of the luggage, for example. If it is determined that the luggage is the redelivery luggage, the redelivery determination unit 33 may recognize the number of redeliveries of the luggage.

The early delivery request reception unit 34 receives a request for early delivery transmitted from the user's mobile terminal 10. The request for early delivery is a request that the user wants to deliver the luggage early. In case of the request for early delivery, the delivery of the luggage may be performed in a priority basis compared to the normal delivery requests. In the request for early delivery, the delivery time may not be specified.

If it is determined by the redelivery determination unit 33 that the luggage is the redelivery luggage, the early delivery request reception unit 34 receives the request for early delivery of a luggage. That is, in the present embodiment, the early delivery request reception unit 34 does not receive a request for early delivery of the luggage if the user's luggage is not the redelivery luggage.

When the request for early delivery of the luggage is received by the early delivery request reception unit 34, the position information acquisition unit 35 acquires the position information on the user's mobile terminal 10. The position information acquisition unit 35 acquires the position information on the mobile terminal 10 by the transmission from the user's mobile terminal 10. The position information acquisition unit 35 may acquire the position information on the user's mobile terminal 10 at the same time of the request for early delivery of the luggage, or may acquire the position information from the mobile terminal 10 by requesting for the position information to the mobile terminal 10 from the server 30 after the early delivery request reception unit 34 receives the request for early delivery.

The position information on the mobile terminal 10 includes current position information (at the time of the transmission from the mobile terminal 10). The position information on the mobile terminal 10 may include past position information (such as a user's travel history).

When the position information on the user's mobile terminal 10 is acquired by the position information acquisition unit 35, the candidate delivery location proposal unit 36 proposes the candidate delivery location to the user's mobile terminal 10. The candidate delivery location is a location that is to be designated as a delivery location by the selection by the user.

The candidate delivery location proposal unit 36 proposes the candidate delivery location from a plurality of predetermined stop locations based on the position information on the user's mobile terminal 10. As an example, the candidate delivery location proposal unit 36 narrows the stop locations down to a stop locations existing within a set distance from the position of the user's mobile terminal 10 set in advance, and then, performs the candidate delivery location proposal. The set distance is not particularly limited. The set distance may be 500 m or may be 300 m.

Figure 4:
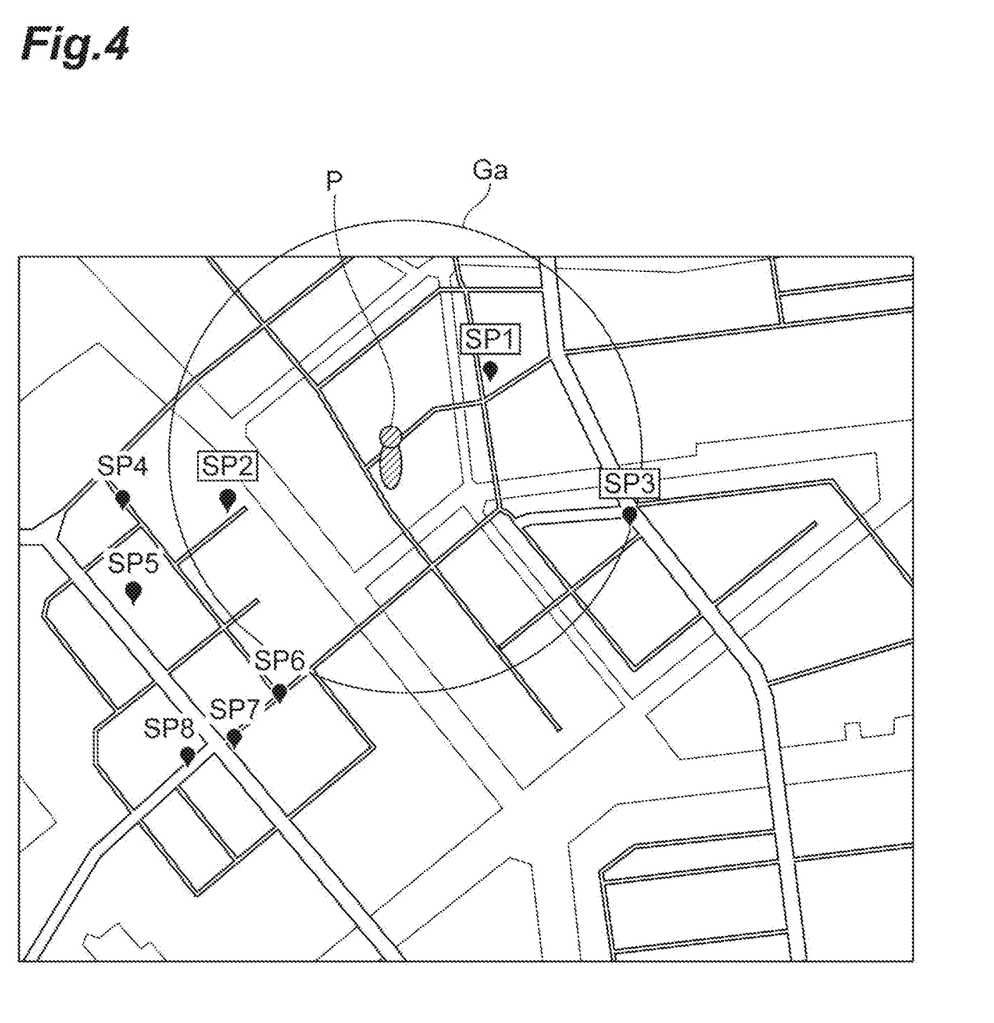
FIG. 4 is a diagram for explaining an example of narrowing a candidate delivery location.

FIG. 4 is a diagram for explaining an example of narrowing the candidate delivery locations. In FIG. 4, a position P of the user's mobile terminal 10, a range Ga within the set distance from the position P, the stop locations SP1 to SP8 are illustrated. The stop locations SP1 to SP8 are, for example, parking lots of convenience stores. For example, the range Ga is a circular range centered on the position P of the user's mobile terminal 10.

In the situation illustrated in FIG. 4, the candidate delivery location proposal unit 36 narrows the stop locations down to the stop locations SP1-SP3 included in the range Ga as the candidate delivery locations among the stop locations SP1 to SP8. The candidate delivery location proposal unit 36 proposes the candidate delivery locations SP1 to SP3 to the user's mobile terminal 10. The codes of the candidate delivery locations are enclosed in frames.

The candidate delivery location proposal unit 36 may use the road traffic information to narrow down the candidate delivery locations. The candidate delivery location proposal unit 36 acquires the road traffic information relating to the stop locations from the traffic information center T. The stop location at which a degree of road congestion is recognized may be limited to a stop location at a certain distance (for example, 1 km) from the position P of the user's mobile terminal 10. The stop location at which the degree of road congestion is recognized may be limited by the driving area of the autonomous driving vehicle 2 or the like. The candidate delivery location proposal unit 36 recognizes the degree of road congestion at the stop location based on the acquired road traffic information. The degree of road congestion is, for example, a density of vehicles on the road within a predetermined distance from the stop location. To recognize the degree of road congestion, the past traffic volume of the vehicles may be referred to. The degree of road congestion is not limited to the density, and may be indicated by any indices.

If the degree of road congestion around the stop location is equal to or higher than a congestion threshold value, the candidate delivery location proposal unit 36 excludes the stop location from the target of narrowing the candidate delivery locations. For example, since there is a possibility that it may be difficult to arrive at the stop location early, and it may not be possible to secure enough time to stop at the location if the stop location is on the road, the candidate delivery location proposal unit 36 excludes the stop location from the target of narrowing the candidate delivery locations.

The method of narrowing the candidate delivery locations is not limited to the method described above. The candidate delivery location proposal unit 36 may narrow down the candidate delivery location using the distance (distance along the road) from the position P of the user's mobile terminal 10 based on the position information on the user's mobile terminal 10 and the map information. The candidate delivery location proposal unit 36 may narrow the stop location having the road distance from the position P of the user's mobile terminal 10 is within the set distance as the candidate delivery location, for example.

Figure 5:
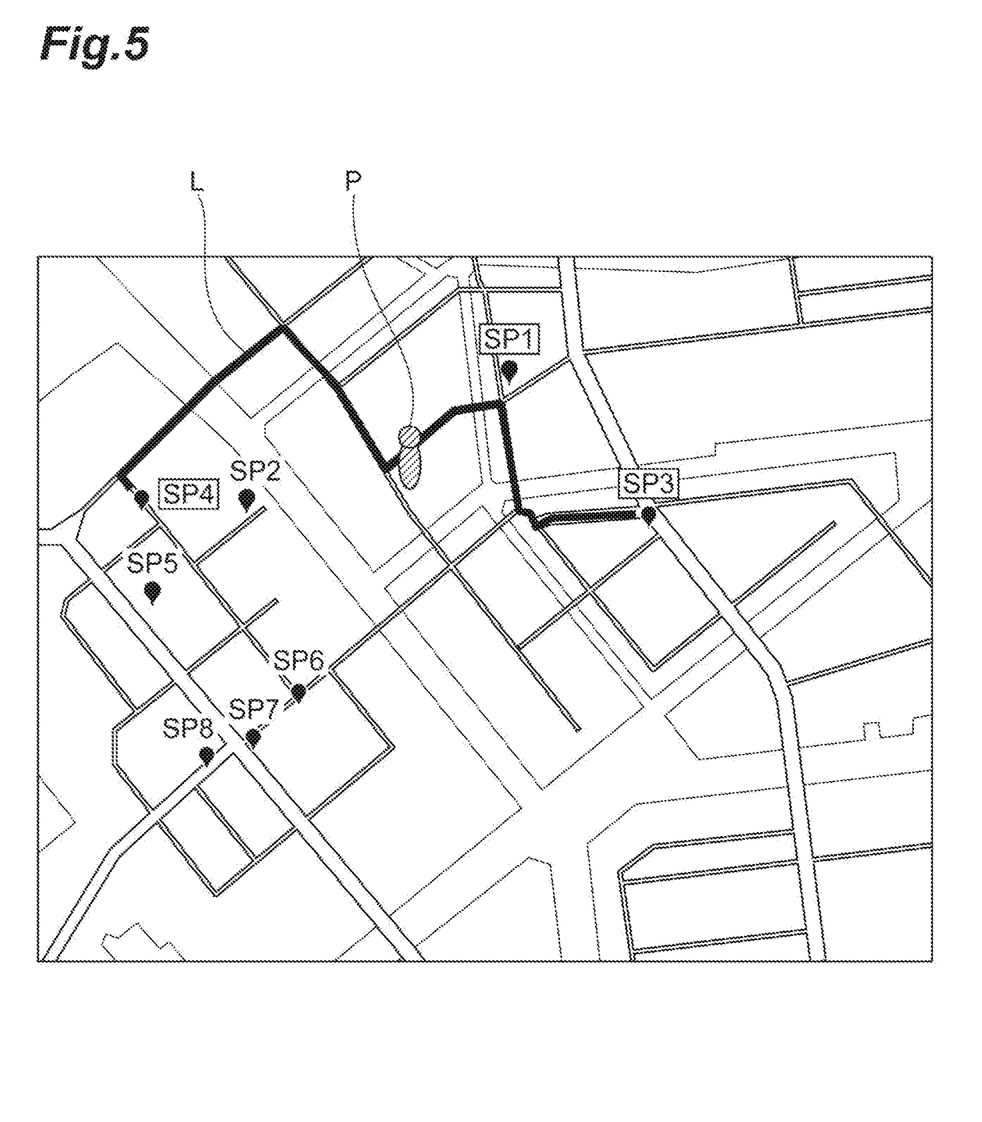
FIG. 5 is a diagram for explaining another example of narrowing the candidate delivery locations.

FIG. 5 is a diagram for explaining another example of narrowing the candidate delivery locations. In FIG. 5, a road L within the set distance from the position P of the user's mobile terminal 10 is indicated by a bold line. As illustrated in FIG. 5, the candidate delivery location proposal unit 36 narrows the stop locations SP1 to SP8 down to the stop locations SP1, SP3, and SP4 that are along the road L within the set distance from the position P of the user's mobile terminal 10 as the candidate delivery locations.

In addition, the candidate delivery location proposal unit 36 may narrow down the candidate delivery locations using the user's travel history based on the position information on the user's mobile terminal 10. For example, the candidate delivery location proposal unit 36 may recognize a commonly-used route through the user frequently passes using the travel history of the user, and then, may narrow down the stop locations along the commonly-used route as the candidate delivery location. The commonly-used route can be recognized from, for example, the number of times the user passes during a certain period. The commonly-used route may be included in the position information on the user's mobile terminal 10.

Figure 6:
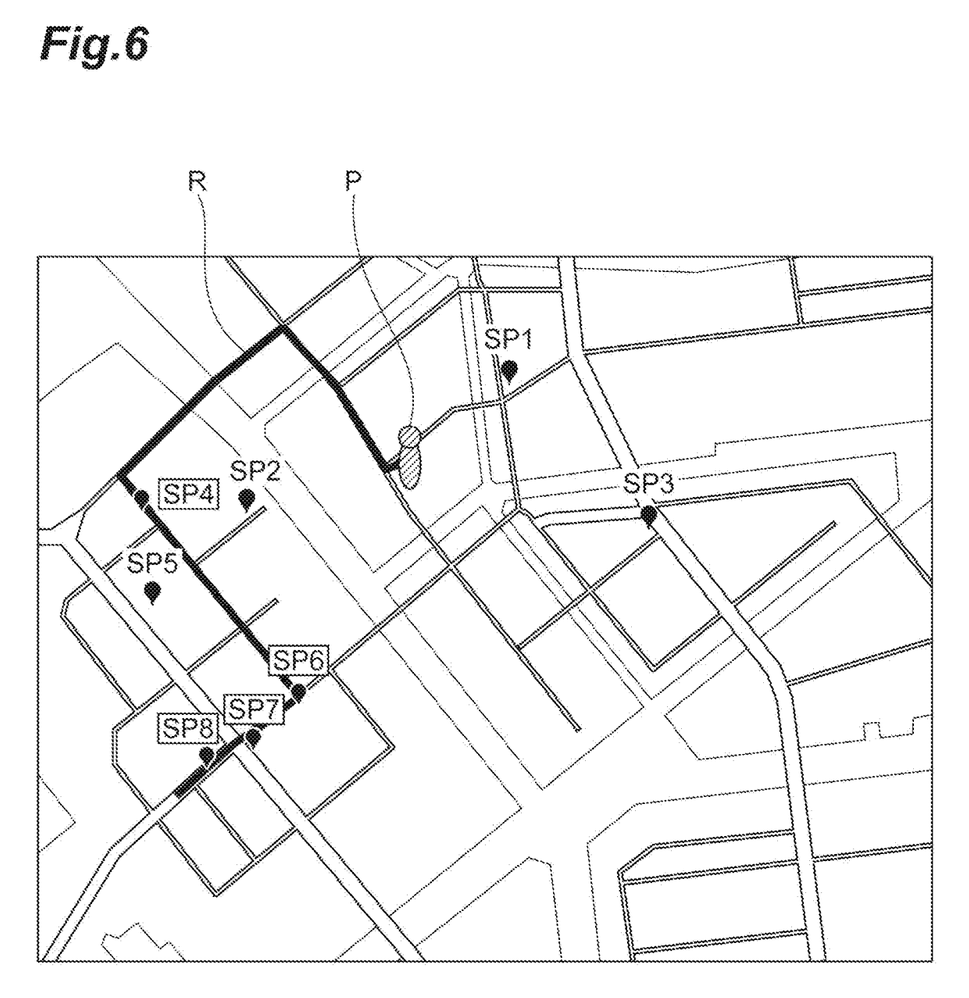
FIG. 6 is a diagram for explaining still another example of narrowing the candidate delivery locations.

FIG. 6 is a diagram for explaining still another example of narrowing the candidate delivery locations. FIG. 6 illustrates a commonly-used route R. In a situation illustrated in FIG. 6, the candidate delivery location proposal unit 36 narrows the stop locations SP1 to SP8 down to the stop locations SP4, SP6, SP7, and SP8 that are along the commonly-used route R as the candidate delivery locations. For example, a stop location adjacent to the commonly-used route R and a stop location on the commonly-used route R are included in the stop locations along the commonly-used route R.

If the position of the user's mobile terminal 10 is excessively separated from the commonly-used route R, the candidate delivery location proposal unit 36 may not perform narrowing the candidate delivery locations using the commonly-used route R. For example, when the distance between the location closest to the position of the user's mobile terminal 10 on the commonly-used route R and the position of the user's mobile terminal 10 is equal to or longer than a separation threshold value, the candidate delivery location proposal unit 36 may not perform narrowing the candidate delivery locations using the commonly-used route R.

The candidate delivery location proposal unit 36 may change the method of narrowing the candidate delivery locations based on the number of redeliveries of the luggage. For example, as the number of redeliveries of the luggage increases, the candidate delivery location proposal unit 36 limits the candidate delivery location to a location closer to the position of the user's mobile terminal 10. Specifically, if the number of redeliveries of the luggage for which the request for early delivery is received is greater than a determination threshold value, the candidate delivery location proposal unit 36 performs limited narrowing in which only the stop locations closer to the position of the user's mobile terminal 10 are narrowed down to the candidate delivery locations compared to a case where the number of redeliveries of the luggage is less than the determination threshold value. The determination threshold value is not particularly limited. The determination threshold value may be two or three.

Figure 7:
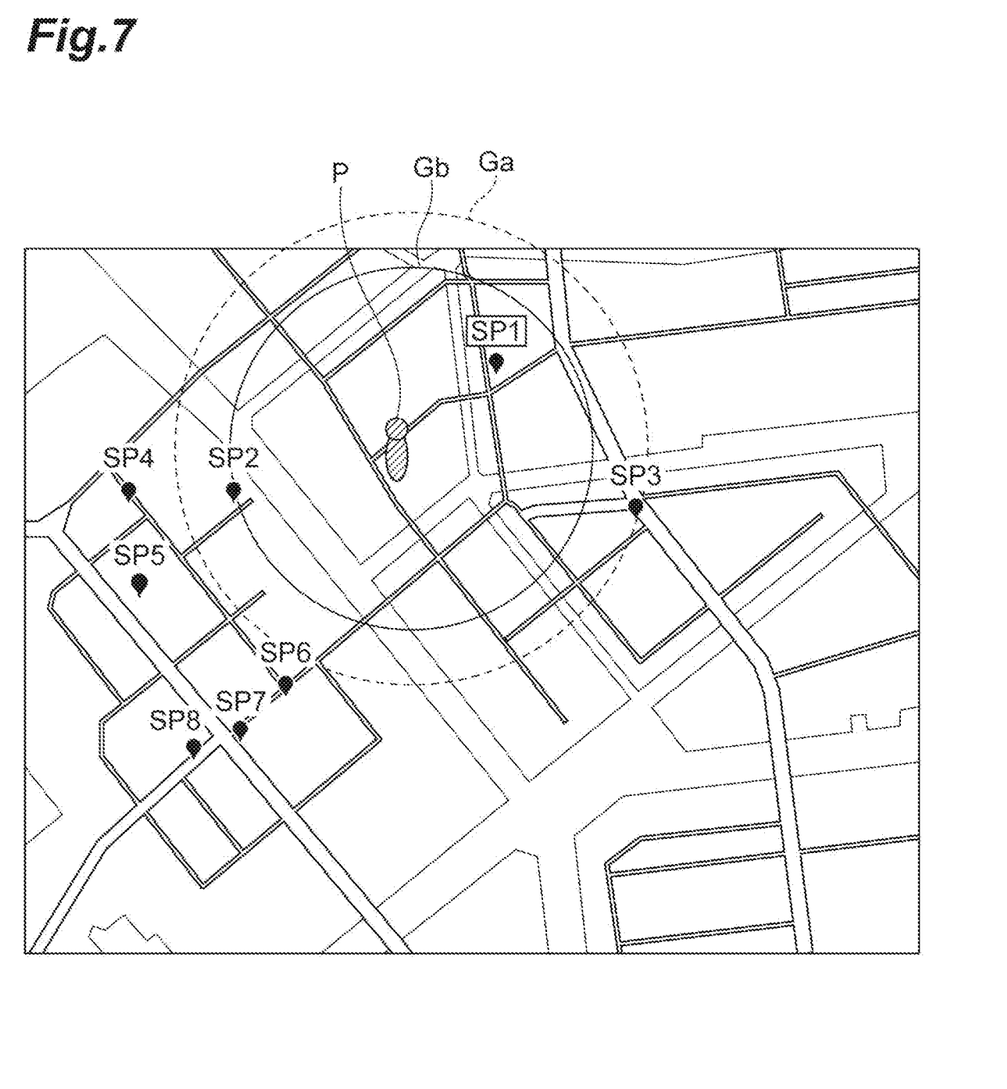
FIG. 7 is a diagram for explaining an example of limited narrowing of the candidate delivery locations.

FIG. 7 is a diagram for explaining an example of the limited narrowing of the candidate delivery locations. FIG. 7 illustrates a limited narrowing range Gb. A range Ga (same as the range Ga in FIG. 3) corresponds to a range when the number of redeliveries of the luggage is less than the determination threshold value, and the limited narrowing range Gb corresponds to a range when the number of redeliveries of the luggage is equal to or greater than the determination threshold value. The limited narrowing range Gb is a range having a short distance compared to the set distance when the number of redeliveries of the luggage is less than the determination threshold value, and thus, the limited narrowing range Gb is a range (narrower range) closer to the position P of the user's mobile terminal 10 than the range Ga.

As illustrated in FIG. 7, if the number of redeliveries of the luggage for which the request for early delivery is received is greater than the determination threshold value, the candidate delivery location proposal unit 36 narrows the stop locations SP1 to SP8 down to only the stop location SP1 within the limited narrowing range Gb as the candidate delivery location. In this case, the candidate delivery location proposal unit 36 excludes the stop locations SP2 and SP3 from the candidate delivery location compared to the case where the number of redeliveries of the luggage is less than the determination threshold value. That is, the candidate delivery location proposal unit 36 limits the candidate delivery locations to a position closer to the position of the users mobile terminal 10 according to the number of redeliveries of the luggage.

The more the number of re-delivery increases, the candidate delivery location proposal unit 36 may limits the candidate delivery locations to the candidate delivery locations closer to the position of the user's mobile terminal 10 without using the threshold value. The candidate delivery location proposal unit 36 may perform the limitation to the road distance from the position of the user's mobile terminal 10 according to the number of redeliveries as illustrated in FIG. 5 instead of the straight line distance from the position of the user's mobile terminal 10.

In addition, the candidate delivery location proposal unit 36 may use the combinations of a plurality of narrowing methods described above. The candidate delivery location proposal unit 36 may narrow the stop location of which the distance from the position P of the user's mobile terminal 10 or the road distance is within the set distance and is along the commonly-used route R, as the candidate delivery location. In addition, the candidate delivery location proposal unit 36 does not necessarily need to consider the number of redeliveries.

The candidate delivery location proposal unit 36 transmits candidate delivery location proposal information relating to the narrowed candidate delivery location to the user's mobile terminal 10. For example, an image as illustrated in FIG. 3 is displayed on the mobile terminal 10. The user recognizes the candidate delivery location from the display on the screen of the mobile terminal 10, and selects the delivery location of the luggage from the proposed candidate delivery locations. The mobile terminal 10 transmits the result of selecting the delivery location by the user to the server 30.

The delivery location determination unit 37 determinates (designates) the candidate delivery location selected by the user as the delivery location based on the result of selecting the delivery location transmitted from the user's mobile terminal 10. The delivery location determination unit 37 transmits a delivery command to the autonomous driving vehicle 2 on which the luggage is loaded based on the designated delivery location.

If the luggage which is subject to be the request for early delivery is placed in a luggage collection place, the delivery location determination unit 37 may transmit the delivery command to an information terminal of the luggage collection place. In this case, the delivery location determination unit 37 may designate the autonomous driving vehicle 2 for loading the luggage. For example, the delivery location determination unit 37 designates the autonomous driving vehicle 2 waiting in the luggage collection place or the autonomous driving vehicle 2 positioned closest to the luggage collection place as a target vehicle for loading the luggage, and then, may transmit the delivery command to the autonomous driving vehicle 2 after loading the luggage.

The map DB 38 is a database that stores the map information. The map DB 38 is stored in the storage 103 of the server 30, for example. The map information is data storing the position information of roads, road structures, buildings, and the like. The map information may include information relating to the stop locations. The registered vehicle DB 39 is stored in the storage 103 of the server 30, for example. The registered vehicle DB 39 stores a vehicle identification number of the autonomous driving vehicle 2, the information on the position of the autonomous driving vehicle 2, and the information on the luggage loaded on the autonomous driving vehicle 2 in association with each other. The registered vehicle DB 39 may store information relating to the stop location corresponding to the vehicle type of the autonomous driving vehicle 2.

Processing by Autonomous Driving Delivery System

Figure 8:
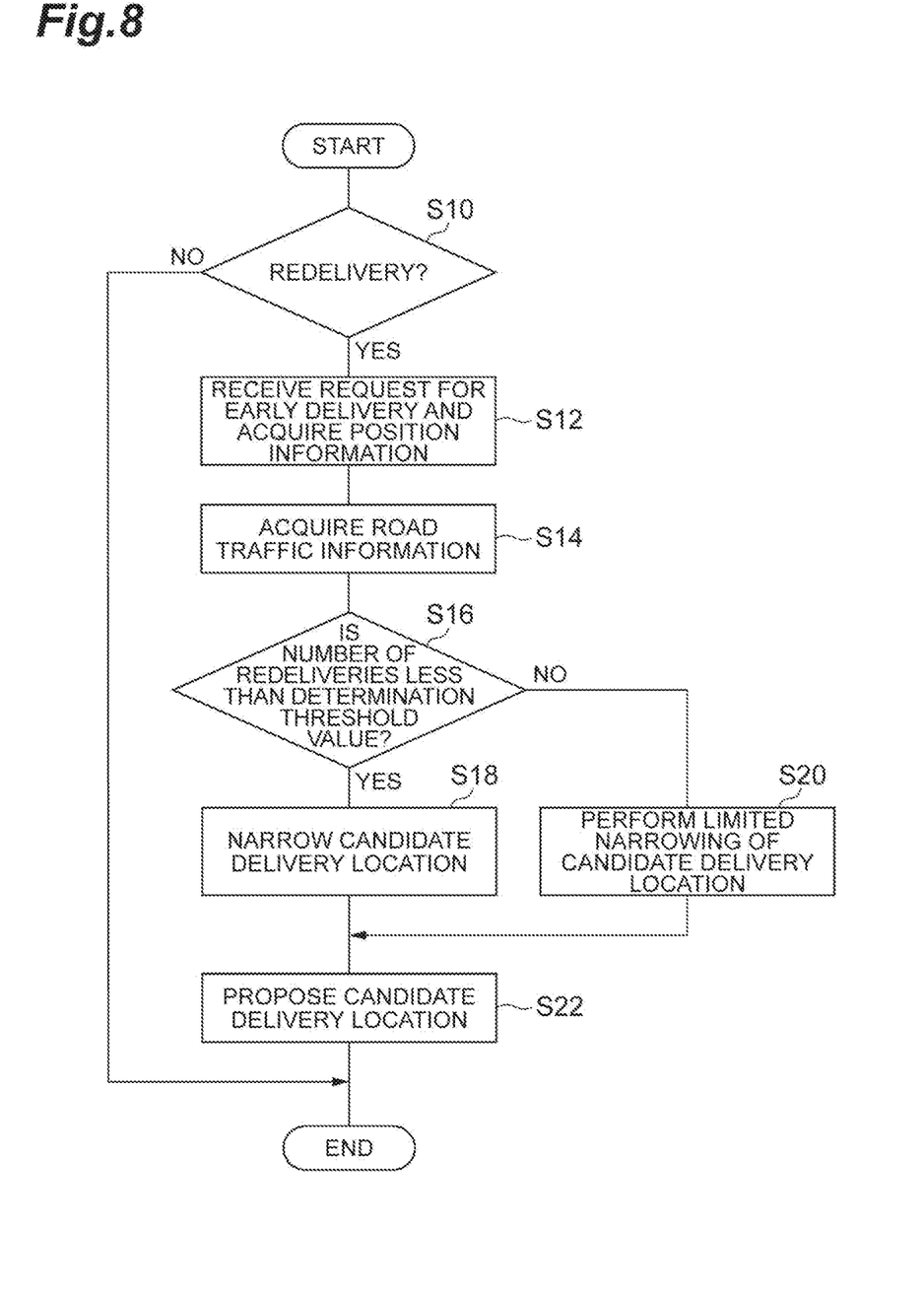
FIG. 8 is a flowchart illustrating an example of candidate delivery location proposal processing.

Next, the processing by the autonomous driving delivery system 1 according to the present embodiment will be described with reference to the drawings. FIG. 8 is a flowchart illustrating an example of a candidate delivery location proposal processing. The candidate delivery location proposal processing is performed, for example, when the server 30 receives a request for early delivery from the user's mobile terminal 10.

As illustrated in FIG. 8, as S10, the server 30 of the autonomous driving delivery system 1 performs the redelivery determination using the redelivery determination unit 33. For example, the redelivery determination unit 33 determines whether the luggage is the redelivery luggage or not based on the delivery history of the luggage. If the luggage is a redelivery luggage subject to be request for early delivery (YES in S10), the server 30 makes the process proceed to S12. If the luggage is not the redelivery luggage subject to be request for early delivery (NO in S10), the server ends the current processing.

In S12, the server 30 receives a request for early delivery of the luggage using the early delivery request reception unit 34. In addition, the server 30 acquires position information on the user's mobile terminal 10 using the position information acquisition unit 35. The position information may be transmitted from the user's mobile terminal 10 simultaneously with the request for early delivery, or may be acquired by a request for the position information from the server 30.

In S14, the server 30 acquires road traffic information using the candidate delivery location proposal unit 36. The candidate delivery location proposal unit 36 acquires the road traffic information relating to the stop location by the communication with the traffic information center T.

In S16, the server 30 determines whether or not the number of redeliveries of the luggage is less than the determination threshold value using the candidate delivery location proposal unit 36. If it is determined that the number of redeliveries of the luggage is less than the determination threshold value (YES in S16), the server 30 makes the process proceed to S18. If it is determined that the number of redeliveries of the luggage is equal to or greater than the determination threshold value (NO in S16), the server 30 makes the process proceed to S20.

In S18, the server 30 narrows the candidate delivery locations using the candidate delivery location proposal unit 36. For example, the candidate delivery location proposal unit 36 excludes the stop locations where the degree of road congestion is equal to or higher than the congestion threshold value from the target of narrowing, and narrows the remaining stop locations down to the stop locations within the set distance from the position of the user's mobile terminal 10 as the candidate delivery locations. Thereafter, the server 30 makes the process proceed to S22.

In S20, the server 30 performs the limited narrowing of the candidate delivery locations using the candidate delivery location proposal unit 36. For example, the candidate delivery location proposal unit 36 excludes the stop locations where the degree of road congestion is equal to or higher than the congestion threshold value from the target of narrowing, and performs the limited narrowing on the remaining stop locations down to the stop locations within a distance shorter than the set distance from the position of the user's mobile terminal 10 as the candidate delivery location. Thereafter, the server 30 makes the process proceed to S22.

In S22, the server 30 performs the candidate delivery location proposal using the candidate delivery location proposal unit 36. The candidate delivery location proposal unit 36 transmits the candidate delivery location proposal information relating to the narrowed candidate delivery location to the user's mobile terminal 10. Thereafter, the server 30 ends the current proposal processing.

Figure 9:
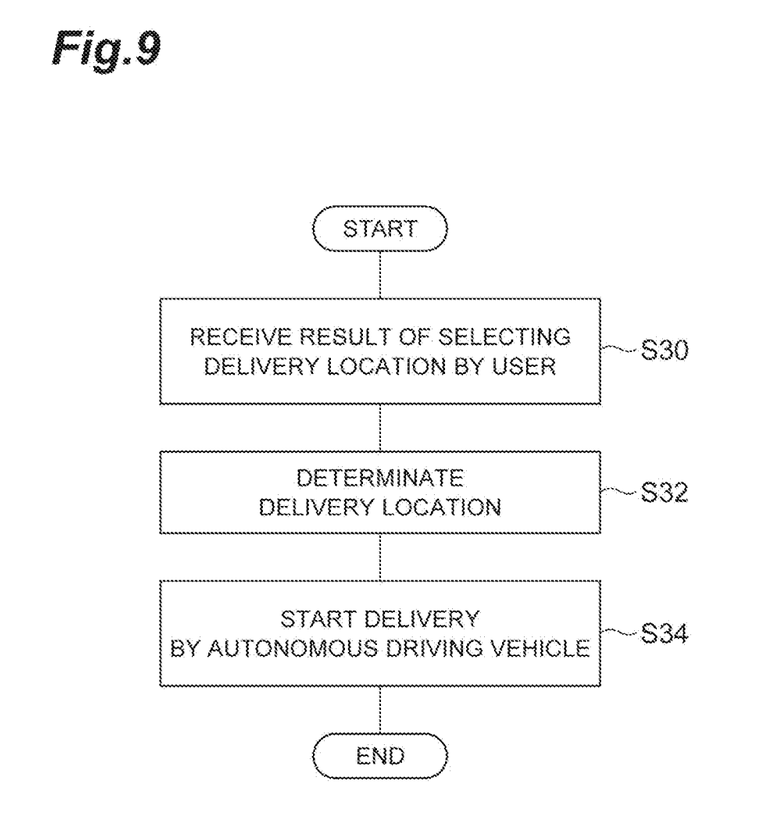
FIG. 9 is a flowchart illustrating an example of delivery location designation processing.

FIG. 9 is a flowchart illustrating an example of delivery location designation processing. The delivery location designation processing is performed when the candidate delivery location proposal is performed by the candidate delivery location proposal unit 36.

As illustrated in FIG. 9, as S30, the server 30 receives a result of selecting the delivery location by the user using the delivery location determination unit 37. Thereafter, as S32, the server 30 determinates the delivery location by the delivery location determination unit 37. The delivery location determination unit 37 designates the candidate delivery location selected by the user as the delivery location.

As S34, the server 30 starts the delivery by the autonomous driving vehicle 2 using the delivery location determination unit 37. Delivery location determination unit 37 starts the delivery by the autonomous driving vehicle 2 by transmitting the delivery command to the autonomous driving vehicle 2 on which the luggage which is subject to be the request for early delivery. For example, the user unlocks the delivery boxes on the autonomous driving vehicle 2 at the delivery location, and receives the luggage.

According to the autonomous driving delivery system 1 relating to the present embodiment described above, the candidate delivery location can be proposed to the user using the position information on the user's mobile terminal 10, and the delivery location can be determined (designated) by the selection of the user from the candidate delivery locations. This is possible to improve the user convenience by setting the delivery location corresponding to the user's position information. Furthermore, according to the autonomous driving delivery system 1, by setting the delivery location taking the user's position information into consideration, it is possible to suppress a situation in which an autonomous driving vehicle or the like waits for a long time until the user arrives. This is possible to improve the delivery efficiency.

In addition, according to the autonomous driving delivery system 1, since the road traffic information relating to a plurality of stop locations, it is possible to avoid candidate delivery location proposals that may impair the user convenience, such as time-consuming delivery due to the road congestion. Furthermore, according to the autonomous driving delivery system 1, since the request for early delivery utilizing the position information on the user's mobile terminal 10 can be received at the time of redelivery that has a large impact on the delivery efficiency, the chances that the user receives the luggage can be improved, and thus, it is possible to improve the delivery efficiency.

In addition, according to the autonomous driving delivery system 1, when the number of redeliveries of the luggage is equal to or greater than the determination threshold value, since it is likely that the possibility of redelivery of the luggage is high compared to a case that the number of redeliveries is less than the determination threshold value, by proposing only the stop locations close to the position of the user's mobile terminal as the candidate delivery locations, it is possible to suppress the occurrence of further redelivery.

The embodiment in the present disclosure is described above, but the present disclosure is not limited to the embodiment described above. The present disclosure can be implemented in various forms including various modifications and improvements based on the knowledge of those skilled in the art including the above-described embodiment.

For example, the server 30 may be mounted on the vehicle. The server 30 may be mounted on the autonomous driving vehicle 2 used for delivery. That is, the ECU 20 of the autonomous driving vehicle 2 may include the functional configuration of the server 30. The server 30 may be a cloud server configured with servers mounted on the ECUs 20 of a plurality of autonomous driving vehicles 2A . . . 2X.

The autonomous driving delivery system 1 does not necessarily need to perform the processing on a normal delivery request as long as the system can perform the processing relating to the request for early delivery. In this case, the autonomous driving delivery system 1 does not need to include the delivery request reception unit 32.

The early delivery request reception unit 34 may receive the request for early delivery even when the user's luggage is not redelivery luggage. In this case, the redelivery determination unit 33 does not necessarily need to be provided. Even at the first delivery of luggage, after recognizing that the luggage has arrived at the luggage collection place where the request for earlier deliver can be made, the user can receive the luggage at early time by performing the request for early delivery based on the position information on the user's mobile terminal 10.

The candidate delivery location proposal unit 36 does not necessarily need to acquire the road traffic information from the traffic information center T, but may acquire the road traffic information by a vehicle-to-vehicle communication or other methods. The candidate delivery location proposal unit 36 may narrow down the candidate delivery locations by recognizing the traffic restrictions due to construction or the like based on the road traffic information. If a route for the autonomous driving vehicle 2 to each stop location is searched for, and it is recognized that the traffic restriction due to the construction or the like exists on the route based on road traffic information, the candidate delivery location proposal unit 36 may exclude the stop location from the target of narrowing.

The candidate delivery location proposal unit 36 once narrowed the candidate delivery locations based on the position information on the user's mobile terminal 10, and thereafter, may further perform narrowing based on the road traffic information relating to the narrowed candidate delivery locations. In this case, the candidate delivery location proposal unit 36 may acquire only the road traffic information relating to the candidate delivery locations (stop locations) narrowed down based on the position information on the user's mobile terminal 10.

In addition, the server 30 does not necessarily need to acquire the road traffic information. In this case, the candidate delivery location proposal unit 36 does not narrow down the candidate delivery locations using the road traffic information.

The delivery location does not necessarily need to be a location where the user himself/herself receives the luggage from the autonomous driving vehicle 2, but may be a delivery location where a clerk of a convenience store, a concierge of an apartment, or a hotel employee can receive and temporarily keep the luggage.

When the autonomous driving vehicle 2 enters a range within a certain distance from the delivery location, or when a remaining time until the autonomous driving vehicle 2 reaches the delivery location is shorter than a certain period of time, the server 30 may re-acquire the position information on the user's mobile terminal 10. The server 30 transmits a warning to the user's mobile terminal 10 when the re-acquired position of the user's mobile terminal 10 is separated more than an allowable distance set from the delivery location in advance.

If the position of user's mobile terminal 10 does not come within the allowable distance from the delivery location after a certain period of time has elapsed from the warning or if the position of the user's mobile terminal 10 does not change, the server 30 may transmit a delivery stop notification to the user's mobile terminal 10 such that the autonomous driving vehicle 2 stops the delivery and proceeds to another delivery processing. In this way, it is possible to improve the delivery efficiency.

What is claimed is:

1. An autonomous driving delivery system that delivers luggage to a plurality of users including a first user, comprising:
   a plurality of autonomous driving vehicles, each having an autonomous driving function for autonomously driving the vehicle toward a location set in advance;
   a server having a candidate delivery location proposal unit, the server configured to instruct an autonomous driving vehicle of the plurality of autonomous driving vehicles on which the corresponding luggage of the first user is loaded among the plurality of autonomous driving vehicles to travel to deliver the luggage by the autonomous driving vehicle;
   an early delivery request reception unit configured to receive a request for early delivery of the luggage from a user's mobile terminal and the early delivery request reception unit is configured to be able to receive the request for early delivery of the luggage when the delivery of the luggage is a redelivery;
   a position information acquisition unit configured to acquire position information of the user's mobile terminal when the early delivery request reception unit receives the request for early delivery;
   the candidate delivery location proposal unit configured to:
     propose at least one candidate delivery location from a plurality of predetermined stop locations to the user's mobile terminal based on the position information when the position information is acquired by the position information acquisition unit;
     narrow down a plurality of stoppable locations set in advance to stoppable locations existing within a distance set in advance from the position of the user's mobile terminal, propose the at least one candidate delivery location from the stoppable locations narrowed down;
     acquire degrees of road congestion as a road traffic information of the stoppable locations, the road traffic information acquired wirelessly from a traffic information center; and
     exclude from the at least one candidate delivery location narrowing down target the stoppable locations having the degree of road congestion equal to or higher than a congestion threshold value; and
     propose only the stop locations close to the position of the user's mobile terminal as the candidate delivery locations when the number of redeliveries of the luggage is equal to or greater than a determination threshold value compared to a case that the number of redeliveries of the luggage is less than the determination threshold value; and
   a delivery location determination unit configured to designate the at least one candidate delivery location selected by the user corresponding to the user's position as a delivery location of the luggage,
   wherein the user's mobile terminal includes a display control unit configured to:
     display a content of the luggage and a delivery status of the luggage;
     perform a display for the user to make a luggage delivery request or the request for early delivery; and
     transmit the luggage delivery request or the request for early delivery including a desired delivery location and a desired delivery time selected by the user to the delivery location determination unit.

2. The autonomous driving delivery system according to claim 1,
   wherein the candidate delivery location proposal unit is configured to propose only the stop locations close to the position of the user's mobile terminal as the candidate delivery locations when the number of redeliveries of the luggage is equal to or greater than a determination threshold value compared to a case that the number of redeliveries of the luggage is less than the determination threshold value.

3. The autonomous driving delivery system according to claim 1, wherein the server re-acquires the position information on the user's mobile terminal when the autonomous driving vehicle enters a range within a certain distance from the delivery location or when a remaining time until the autonomous driving vehicle reaches the delivery location is shorter than a certain period of time, transmits a warning to the user's mobile terminal when the re-acquired position of the user's mobile terminal is separated more than an allowable distance set from the delivery location in advance, and transmit a delivery stop notification to the user's mobile terminal such that the autonomous driving vehicle stops the delivery when the position of user's mobile terminal does not come within the allowable distance from the delivery location after a certain period of time has elapsed from the warning or when the position of the user's mobile terminal does not change.

* * * * *